No. 681,212. Patented Aug. 27, 1901.
A. GEHRINGER.
CART SHOVEL AND SCRAPER.
(Application filed Dec. 27, 1900.)
(No Model.)
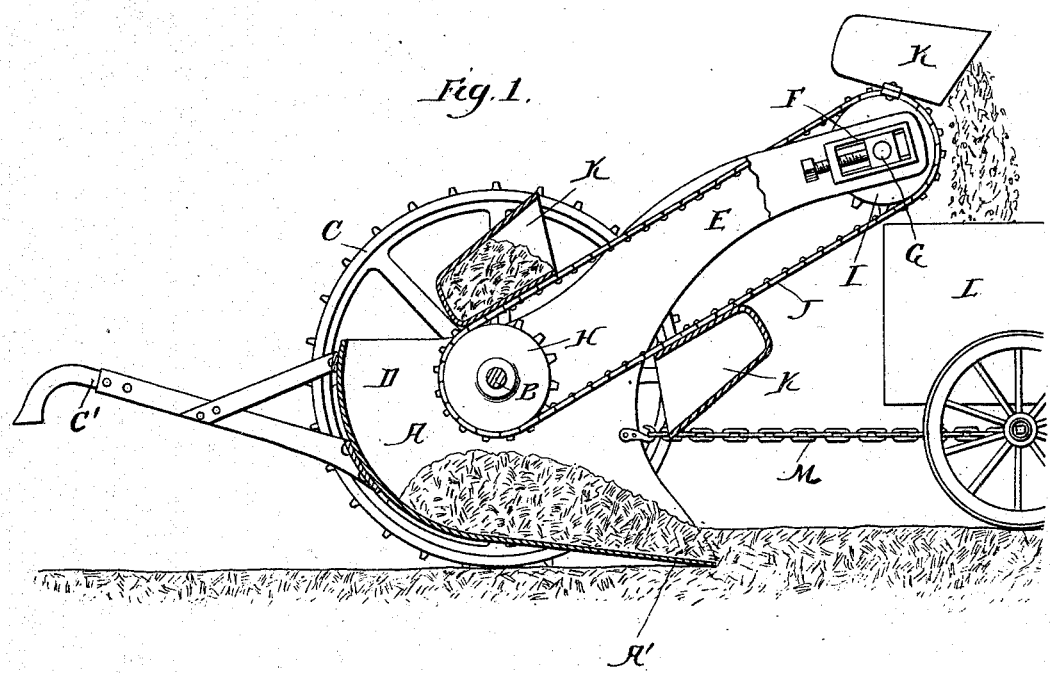
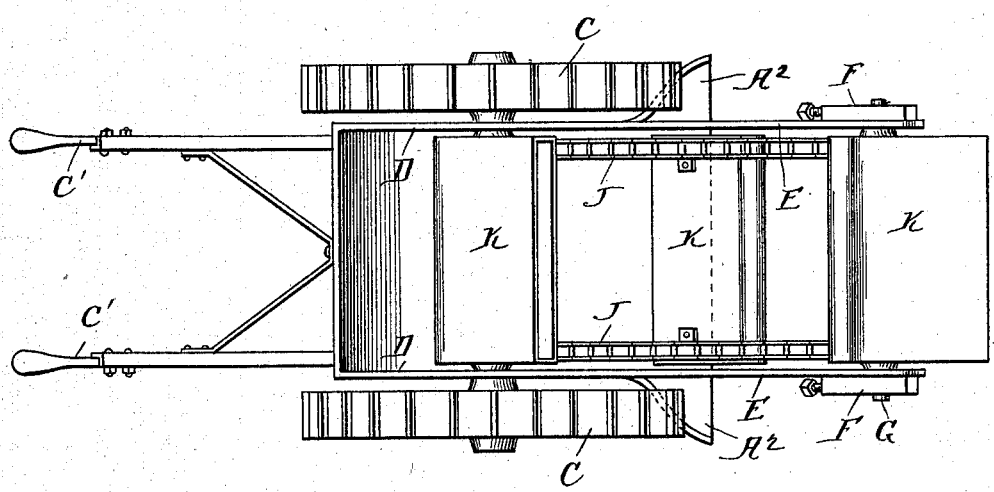
Witnesses:
H. B. Hallock.
L. A. Morrison
Inventor:
Adam Gehringer
By
W. Preston Williamson.
Atty.

UNITED STATES PATENT OFFICE.

ADAM GEHRINGER, OF PHILADELPHIA, PENNSYLVANIA.

CART SHOVEL AND SCRAPER.

SPECIFICATION forming part of Letters Patent No. 681,212, dated August 27, 1901.

Application filed December 27, 1900. Serial No. 41,253. (No model.)

*To all whom it may concern:*

Be it known that I, ADAM GEHRINGER, a citizen of the United States, residing at Philadelphia, county of Philadelphia, and State of Pennsylvania, have invented a certain new and useful Improvement in Cart Shovels and Scrapers, of which the following is a specification.

My invention relates to a new and useful improvement in cart shovels and scrapers, and has for its object to provide a shovel and scraper wherein the dirt after it has been scraped up is carried upward by a series of buckets and deposited in a cart in front of the scraper, and this cart also being connected to the scraper furnishes motor power for the same.

With these ends in view this invention consists in the details of construction and combination of elements hereinafter set forth and then specifically designated in the claims.

In order that those skilled in the art to which this invention appertains may understand how to make and use the same, the construction and operation will now be described in detail, referring to the accompanying drawings, forming a part of this specification, in which—

Figure 1 represents a longitudinal sectional view of my invention, and Fig. 2 is a plan view of the same.

In carrying out my invention as here embodied, A represents the shovel or scraper, which is mounted upon the axle B.

C C are two large traction-wheels, which are secured to the outer ends of the axle B on each side of the shovel A. The wheel C has the usual projections on the edge to prevent the slipping of the wheels.

The shovel or scraper A consists of the nose A', which is adapted to do the scraping or excavating. This nose A' is wider than the rest of the shovel and extends out, as shown in Fig. 2, at the points A², so that the dirt will be scraped or excavated from the front of the wheels C. The rear portion of the shovel A is formed concentric with the axle B, and to the rear portion is attached the handles C' for the purpose of guiding and regulating the depth of the cut of the scraper. The sides D of the shovel or scraper have bearings formed therein which surround the axle B, and in this manner the shovel is suspended from said axle.

E represents gooseneck extensions which extend upward and forward from the sides D of the shovel. Bearings F are provided in the forward end of these extensions E. A shaft G is journaled in these bearings and extends across from one to the other. Mounted upon the axle B, upon each side of the interior of the shovel, are two sprocket-wheels H. Mounted upon the shaft G are two sprocket-wheels I. Endless link-belts J pass over the sprocket-wheels H and I, and to these link-belts are secured at certain intervals the buckets K. These buckets in traveling around the chain will when they reach the concentric portion of the shaft A scoop up some of the dirt and carry the same upward and forward, and when the bucket passes around the sprocket-wheels I in its return movement the dirt will be deposited at that point.

L is an ordinary cart used for the purpose of hauling dirt and the like, and this cart is connected to the shovel by any suitable means, (here shown as the chain M,) so that when the cart is pulled forward the shovel or scraper will be dragged along with the same. The cart will be fastened to the scraper in such a manner that the rear end of the cart will lie underneath the sprocket-wheels I, so that when the dirt falls from out of the buckets K it will be deposited in the cart L, and when one cart is full an empty cart is fastened in its place.

In the scraping-shovels now used the horses are attached directly to the shovels, and when the shovel is full the man that is guiding the same will tilt the shovel upward, so that it will cease excavating, and then the load will be carried to some convenient place, where it will be dumped. My invention overcomes all of these disadvantages, as the excavating or scraping does not need to be stopped, for as soon as one cart is full another cart is attached in place of it, thus saving considerable time and labor and also rendering it possible to do better work on account of the continuous action of the scraper.

A further advantage of my invention consists in the simplicity of construction, which will render the mechanism durable, while at the same time allowing it to be manufactured at a comparatively small cost.

Of course I do not wish to be limited to the exact construction here shown, as slight modifications could be made without departing from the spirit of my invention.

Having thus fully described my invention, what I claim as new and useful is—

1. In an apparatus of the character described, two traction-wheels secured to a common axle, a shovel or scraper pivoted upon said axle, sprocket-wheels secured upon said axle, an extension extending upward and forward from the sides of the shovel or scraper, sprocket-wheels journaled in the forward end of said extension, continuous link-belts adapted to pass around the first and last named sprocket-wheels, buckets adapted to be carried by said link-belts, a vehicle adapted to be secured to said shovel, the rear end of said vehicle adapted to lie beneath the end of the forwardly-extending extension, handles secured to the rear end of the shovel, substantially as and for the purpose specified.

2. In combination, a cart shovel and scraper, two traction-wheels C, a shaft B, the ends of which are secured to the traction-wheels, a shovel or scraper A, the sides D of which are pivoted between the two wheels and upon the shaft B, two sprocket-wheels H journaled upon the shaft B between the two sides of the scraper, an extension E extending upward and forward from the sides E, two sprocket-wheels I journaled in the forward ends of said extension, an endless belt J adapted to pass over the sprocket-wheels H and I, buckets secured to and adapted to travel with the belt J, a cart adapted to be secured to the shovel and furnish power for the same, and also to furnish a receptacle into which the material excavated is adapted to be deposited, handles secured to the rear end of the shovel for the purpose of guiding the same, substantially as described and for the purpose specified.

3. In a scraping or excavating device, a pair of traction-wheels, an axle, upon the ends of which the said traction-wheels are secured, a shovel or scoop pivoted between said traction-wheels upon the axle thereof, said scoop consisting of a nose which is adapted to scrape or dig into the earth, said nose being flared on each side so as to operate in front of the traction-wheels, the rear end of the scoop being formed concentric with the axle, an elevating apparatus adapted to be driven by the traction-wheels for the purpose of removing the earth or other material accumulated in the scoop and depositing it in a suitable receptacle adapted to travel in front of the apparatus, and handles secured to the rear end of the scoop for the purpose of guiding and regulating the depth of the cut, substantially as described and for the purpose specified.

In testimony whereof I have hereunto affixed my signature in the presence of two subscribing witnesses.

ADAM GEHRINGER.

Witnesses:
JOHN A. GEHRINGER,
JOHN T. EHINGER.